United States Patent
Worden et al.

(10) Patent No.: US 10,233,920 B2
(45) Date of Patent: Mar. 19, 2019

(54) SYSTEM AND METHOD FOR A COMPRESSOR

(71) Applicant: GENERAL ELECTRIC COMPANY, Schenectady, NY (US)

(72) Inventors: Bret Dwayne Worden, Erie, PA (US); Richard C. Peoples, Grove City, PA (US); David E. Peterson, Lawrence Park, PA (US); Jason M. Strode, Lawrence Park, PA (US); Neil W. Burkell, Lawrence Park, PA (US); Milan Karunaratne, Lawrence Park, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 295 days.

(21) Appl. No.: 13/866,435

(22) Filed: Apr. 19, 2013

(65) Prior Publication Data

US 2013/0294934 A1 Nov. 7, 2013

Related U.S. Application Data

(60) Provisional application No. 61/636,192, filed on Apr. 20, 2012.

(51) Int. Cl.
*F04B 49/00* (2006.01)
*F04B 49/06* (2006.01)
(Continued)

(52) U.S. Cl.
CPC ............ *F04B 49/065* (2013.01); *F04B 23/02* (2013.01); *F04B 25/00* (2013.01); *F04B 41/02* (2013.01);
(Continued)

(58) Field of Classification Search
CPC .. F15B 19/005; F16K 37/0091; F16K 37/005; F04B 2201/0605; F04B 23/02;
(Continued)

(56) References Cited

U.S. PATENT DOCUMENTS 2,738,659 A 3/1956 Heed
3,216,648 A 11/1965 Ford
(Continued)

FOREIGN PATENT DOCUMENTS

CN 1227918 A 9/1999
CN 2351587 Y 12/1999
(Continued)

OTHER PUBLICATIONS

Machine Translation of DE 102007039793.*
(Continued)

*Primary Examiner* — Devon Kramer
*Assistant Examiner* — Christopher Bobish
(74) *Attorney, Agent, or Firm* — Christopher R. Carroll; The Small Patent Law Group LLC

(57) ABSTRACT

Systems and methods of the invention relate to diagnosing a compressor. A method may include monitoring a pressure of compressed air within a reservoir, actuating a piston within a cylinder of the compressor, and detecting a leak condition of an exhaust valve of the cylinder through recognition of a change in the monitored pressure of the compressed air within the reservoir during a time period in which the piston is actuated. A system is also disclosed including an engine, a compressor operatively connected to the engine, and a controller that is operable to determine a condition of the compressor.

21 Claims, 6 Drawing Sheets

(51) Int. Cl.
- *F04B 41/02* (2006.01)
- *F04B 23/02* (2006.01)
- *F16K 37/00* (2006.01)
- *F04B 49/10* (2006.01)
- *F04B 51/00* (2006.01)
- *F04B 49/02* (2006.01)
- *F04B 25/00* (2006.01)
- *G01M 3/28* (2006.01)
- *F15B 19/00* (2006.01)

(52) U.S. Cl.
CPC ............ *F04B 49/02* (2013.01); *F04B 49/022* (2013.01); *F04B 49/10* (2013.01); *F04B 51/00* (2013.01); *F16K 37/0091* (2013.01); *F04B 2201/0605* (2013.01); *F04B 2205/063* (2013.01); *F15B 19/005* (2013.01); *G01M 3/2876* (2013.01)

(58) Field of Classification Search
CPC ........ F04B 23/025; F04B 41/02; F04B 49/03; F04B 49/24; F04B 27/067; F04B 51/00; F04B 49/022; F04B 49/10; F04B 2205/063; G01M 3/2876
USPC .................................................. 702/51, 183
See application file for complete search history.

(56) References Cited

U.S. PATENT DOCUMENTS

| | | | |
|---|---|---|---|
| 3,299,825 A * | 1/1967 | Bjphirndal | B66D 1/08 418/196 |
| 3,592,563 A | 7/1971 | Glass et al. | |
| 3,778,761 A | 12/1973 | Cribbins | |
| 3,855,509 A | 12/1974 | Wright | |
| 4,112,703 A | 9/1978 | Kountz | |
| 4,216,672 A | 8/1980 | Henry et al. | |
| 4,216,915 A | 8/1980 | Hengartner et al. | |
| 4,248,053 A | 2/1981 | Sisk | |
| 4,334,427 A | 6/1982 | Armstrong | |
| 4,364,268 A | 12/1982 | Zompolas | |
| 4,653,986 A | 3/1987 | Ashton | |
| 4,687,982 A | 8/1987 | Palaniappan | |
| 4,689,602 A | 8/1987 | Morihara et al. | |
| 4,793,047 A | 12/1988 | Curtis et al. | |
| 5,000,664 A | 3/1991 | Lawless et al. | |
| 5,106,270 A | 4/1992 | Goettel et al. | |
| 5,112,196 A | 5/1992 | Schuh | |
| 5,437,422 A | 8/1995 | Newman | |
| 5,471,400 A * | 11/1995 | Smalley et al. | 702/51 |
| 5,487,516 A | 1/1996 | Murata et al. | |
| 5,546,015 A | 8/1996 | Okabe | |
| 5,685,507 A | 11/1997 | Horst et al. | |
| 5,711,272 A | 1/1998 | Maegawa et al. | |
| 5,728,941 A | 3/1998 | Yamamoto et al. | |
| 5,738,311 A | 4/1998 | Fernandez | |
| 5,777,547 A | 7/1998 | Waldrop | |
| 5,785,081 A | 7/1998 | Krawczyk et al. | |
| 5,817,934 A | 10/1998 | Skantar | |
| 5,860,800 A | 1/1999 | Kramer et al. | |
| 5,883,489 A | 3/1999 | Konrad | |
| 5,885,060 A | 3/1999 | Cunkelman et al. | |
| 5,897,597 A | 4/1999 | O'Daniel | |
| 5,950,967 A | 9/1999 | Montgomery | |
| 5,986,577 A | 11/1999 | Bezos | |
| 5,986,579 A | 11/1999 | Halvorson | |
| 6,023,651 A | 2/2000 | Nakayama et al. | |
| 6,027,311 A | 2/2000 | Hill et al. | |
| 6,036,456 A | 3/2000 | Peters et al. | |
| 6,045,197 A | 4/2000 | McGaugh | |
| 6,062,825 A | 5/2000 | Chovan | |
| 6,081,769 A | 6/2000 | Curtis | |
| 6,098,412 A * | 8/2000 | Porter et al. | 62/126 |
| 6,132,012 A | 10/2000 | Ishii | |
| 6,132,177 A | 10/2000 | Loprete et al. | |
| 6,203,285 B1 | 3/2001 | Wagner et al. | |
| 6,305,313 B1 | 10/2001 | Cunkelman et al. | |
| 6,341,497 B2 | 1/2002 | Herrick et al. | |
| 6,390,779 B1 | 5/2002 | Cunkelman | |
| 6,456,937 B1 | 9/2002 | Doner et al. | |
| 6,490,523 B2 | 12/2002 | Doner | |
| 6,510,731 B2 | 1/2003 | Schricker et al. | |
| 6,616,416 B1 | 9/2003 | Tolbert, Jr. | |
| 6,651,034 B1 | 11/2003 | Hedlund et al. | |
| 6,658,346 B2 | 12/2003 | Maegawa | |
| 6,679,689 B2 | 1/2004 | Takahashi et al. | |
| 6,680,918 B1 | 1/2004 | Haley | |
| 6,691,957 B2 | 2/2004 | Hess, Jr. et al. | |
| 6,758,147 B2 | 7/2004 | Howard et al. | |
| 6,759,951 B2 | 7/2004 | Kellner et al. | |
| 6,837,550 B2 | 1/2005 | Dougherty et al. | |
| 6,862,502 B2 | 3/2005 | Peltz et al. | |
| 6,922,619 B2 | 7/2005 | Baig et al. | |
| 6,937,925 B2 | 8/2005 | Smith | |
| 6,968,268 B2 | 11/2005 | Yamada et al. | |
| 6,972,670 B2 | 12/2005 | Laduc et al. | |
| 6,997,418 B1 | 2/2006 | Sanzone | |
| 7,008,472 B2 | 3/2006 | Fornof et al. | |
| 7,021,588 B2 | 4/2006 | Hess, Jr. et al. | |
| 7,031,850 B2 * | 4/2006 | Kambli et al. | 702/51 |
| 7,073,753 B2 | 7/2006 | Root et al. | |
| 7,111,592 B1 | 9/2006 | Kern et al. | |
| 7,124,057 B2 * | 10/2006 | Forster et al. | 702/183 |
| 7,133,766 B2 | 11/2006 | Kokubo | |
| 7,153,106 B2 | 12/2006 | Cornwell | |
| 7,177,732 B2 | 2/2007 | Kraeling et al. | |
| 7,197,916 B2 | 4/2007 | Matsumoto et al. | |
| 7,216,552 B2 | 5/2007 | Fogelstrom | |
| 7,222,003 B2 | 5/2007 | Stull et al. | |
| 7,302,895 B2 | 12/2007 | Kumar et al. | |
| 7,309,929 B2 | 12/2007 | Donnelly et al. | |
| 7,388,483 B2 | 6/2008 | Welles et al. | |
| 7,395,141 B1 | 7/2008 | Seck et al. | |
| 7,428,453 B2 | 9/2008 | Davenport et al. | |
| 7,447,571 B2 | 11/2008 | Nickles et al. | |
| 7,509,233 B2 | 3/2009 | Pervaiz | |
| 7,522,990 B2 | 4/2009 | Daum et al. | |
| 7,618,011 B2 | 11/2009 | Oleski et al. | |
| 7,620,522 B2 | 11/2009 | Bredau et al. | |
| 7,650,207 B2 | 1/2010 | Metzger | |
| 7,715,956 B2 | 5/2010 | Bryant | |
| 7,761,223 B2 | 7/2010 | Wang et al. | |
| 7,983,805 B2 | 7/2011 | Bryant | |
| 8,073,582 B2 | 12/2011 | Kellner et al. | |
| 8,147,211 B2 | 4/2012 | Grant et al. | |
| 8,147,215 B2 * | 4/2012 | Rigal | F04B 3/00 417/244 |
| 8,190,314 B2 | 5/2012 | Smith et al. | |
| 8,522,690 B2 | 9/2013 | Smith et al. | |
| 8,696,335 B2 | 4/2014 | Fujimoto et al. | |
| 8,725,323 B2 | 5/2014 | Cooper et al. | |
| 8,961,147 B2 | 2/2015 | Van Campfort et al. | |
| 8,984,930 B2 | 3/2015 | Worden et al. | |
| 9,109,517 B2 | 8/2015 | Banerjee et al. | |
| 9,114,817 B2 | 8/2015 | Kraeling et al. | |
| 9,550,484 B2 | 1/2017 | Smith et al. | |
| 2002/0050271 A1 | 5/2002 | Hasegawa et al. | |
| 2002/0051710 A1 | 5/2002 | Yoo et al. | |
| 2002/0072833 A1 | 6/2002 | Gray | |
| 2002/0159896 A1 | 10/2002 | Finnamore et al. | |
| 2003/0077179 A1 | 4/2003 | Collins et al. | |
| 2004/0079226 A1 | 4/2004 | Barrett | |
| 2004/0120825 A1 | 6/2004 | Bouton et al. | |
| 2004/0148926 A1 | 8/2004 | Morinaga et al. | |
| 2004/0167738 A1 * | 8/2004 | Miller | 702/114 |
| 2004/0193384 A1 | 9/2004 | Edlund et al. | |
| 2004/0267450 A1 | 12/2004 | Kernwein | |
| 2005/0204805 A1 | 9/2005 | Wakahara et al. | |
| 2006/0033611 A1 | 2/2006 | Froitzheim | |
| 2006/0222515 A1 | 10/2006 | Delmotte et al. | |
| 2006/0224309 A1 | 10/2006 | Schmidt et al. | |
| 2007/0000308 A1 | 1/2007 | Weissgerber | |
| 2007/0068181 A1 | 3/2007 | Kim | |

(56) References Cited

U.S. PATENT DOCUMENTS

| | | | |
|---|---|---|---|
| 2007/0253838 | A1 | 11/2007 | Leiss |
| 2008/0022702 | A1 | 1/2008 | Fijas et al. |
| 2008/0257532 | A1 | 10/2008 | Fijas et al. |
| 2009/0076669 | A1 | 3/2009 | Krishnaswamy et al. |
| 2009/0120174 | A1 | 5/2009 | Nodera et al. |
| 2009/0229355 | A1 | 9/2009 | Shoda |
| 2009/0248226 | A1 | 10/2009 | Kellner et al. |
| 2010/0049384 | A1 | 2/2010 | Kraeling et al. |
| 2010/0106458 | A1 | 4/2010 | Leu et al. |
| 2010/0130124 | A1 | 5/2010 | Teeter et al. |
| 2010/0147270 | A1 | 6/2010 | Pursifull et al. |
| 2010/0153027 | A1* | 6/2010 | Bredau et al. .............. 702/51 |
| 2010/0162797 | A1 | 7/2010 | Summers et al. |
| 2010/0211296 | A1 | 8/2010 | Saunders |
| 2010/0235017 | A1 | 9/2010 | Peltonen et al. |
| 2010/0281843 | A1 | 11/2010 | Smith |
| 2010/0303658 | A1 | 12/2010 | Ito et al. |
| 2011/0056708 | A1 | 3/2011 | Gamble et al. |
| 2011/0213538 | A1 | 9/2011 | Amann et al. |
| 2011/0320071 | A1 | 12/2011 | Karg |
| 2012/0243375 | A1 | 9/2012 | Melvin, II et al. |
| 2012/0316707 | A1 | 12/2012 | Kraeling et al. |
| 2012/0316708 | A1 | 12/2012 | Kraeling et al. |
| 2012/0317282 | A1 | 12/2012 | Kraeling et al. |
| 2012/0321486 | A1 | 12/2012 | Scarpinato et al. |
| 2013/0168503 | A1 | 7/2013 | Cooper et al. |
| 2013/0280095 | A1 | 10/2013 | Worden et al. |
| 2013/0336810 | A1 | 12/2013 | Worden et al. |
| 2014/0136031 | A1 | 5/2014 | Burnett et al. |
| 2014/0188306 | A1 | 7/2014 | Kumar et al. |
| 2014/0372498 | A1 | 12/2014 | Mian et al. |

FOREIGN PATENT DOCUMENTS

| | | | |
|---|---|---|---|
| CN | 1880936 A | 12/2006 | |
| CN | 201358901 Y | 12/2009 | |
| CN | 101654113 A | 2/2010 | |
| CN | 201439746 U | 4/2010 | |
| CN | 102292253 A | 12/2011 | |
| CN | 102348589 A | 2/2012 | |
| DE | 10052664 A1 * | 5/2002 | ............... F15B 21/00 |
| DE | 102007039793 A1 * | 2/2009 | ............... G01M 3/26 |
| EP | 0522849 A1 | 1/1993 | |
| EP | 1253059 A1 | 10/2002 | |
| EP | 1508736 A1 | 2/2005 | |
| EP | 1947341 A1 | 7/2008 | |
| EP | 2236863 B1 | 11/2012 | |
| GB | 658118 A | 10/1951 | |
| JP | 2003021072 A | 1/2003 | |
| KR | 100779192 B1 | 11/2007 | |
| RU | 32457 U1 | 9/2003 | |
| RU | 2238860 C1 | 10/2004 | |
| RU | 2519793 C1 | 6/2014 | |
| SU | 498189 A1 | 1/1976 | |
| WO | 2006056214 A1 | 6/2006 | |
| WO | 2007084140 A1 | 7/2007 | |
| WO | 2008033677 A2 | 3/2008 | |
| WO | WO 2012070947 A1 * | 5/2012 | ............... F04B 51/00 |
| WO | 2014004003 A2 | 1/2014 | |

OTHER PUBLICATIONS

PCT Search Report and Written Opinion issued in connection with corresponding Application No. PCT/US2013037567 dated Aug. 25, 2014.
PCT Search Report and Written opinion of Application No. PCT/US2012/053520 dated Dec. 17, 2012.
Bearing Failure Detection on an Air Compressor Case History downloaded from http://www.termogram.com/articulos/doc_download/3-case-study-azimadli-compresor-de-aire, date of publication uncertain, but possibly published no later than Jan. 12, 2010.
Lynch et al., Acoustical Oceanography and Underwater Acoustics: Acoustical Measurement of Coastal Ocean Processes I, Acoustical Society of America, vol. No. 101, Issue No. 5, pp. 3015-3048, May 1997.
PCT Search Report and Written Opinion issued in connection with related PCT Application No. PCT/US2013/036527 dated Aug. 25, 2014.
U.S. Notice of Allowance issued in connection with related U.S. Appl. No. 13/233,856 dated Nov. 21, 2014.
U.S. Non-Final Office Action issued in connection with related U.S. Appl. No. 13/857,334 dated Apr. 10, 2015.
Unofficial English Translation of Chinese Office Action issued in connection with related CN Application No. 201280044852.X dated Apr. 22, 2015.
U.S. Non-Final Office Action issued in connection with corresponding U.S. Appl. No. 13/866,573 dated May 7, 2015.
U.S. Non-Final Office Action issued in connection with corresponding U.S. Appl. No. 13/866,670 dated May 22, 2015.
U.S. Final Office Action issued in connection with corresponding U.S. Appl. No. 13/866,670 dated Dec. 17, 2015.
U.S. Final Office Action issued in connection with corresponding U.S. Appl. No. 13/866,573 dated Dec. 31, 2015.
U.S. Final Office Action issued in connection with related U.S. Appl. No. 13/857,334 dated Jan. 14, 2016.
Unofficial English Translation of Chinese Office Action issued in connection with corresponding CN Application No. 201380032394.2 dated Feb. 2, 2016.
U.S. Non-Final Office Action issued in connection with corresponding U.S. Appl. No. 13/866,471 dated Mar. 24, 2016.
Australian Office Action issued in connection with corresponding AU Application No. 2013248977 dated Apr. 20, 2016.
U.S. Non-Final Office Action issued in connection with corresponding U.S. Appl. No. 13/866,573 dated Jun. 3, 2016.
U.S. Non-Final Office Action issued in connection with corresponding U.S. Appl. No. 13/866,499 dated Jul. 14, 2016.
U.S. Non-Final Office Action issued in connection with related U.S. Appl. No. 13/956,426 dated Jul. 27, 2016.
Robert James Foy et al., filed Oct. 25, 2006, U.S. Appl. No. 11/552,602.
Jared Klineman Cooper et al., filed Aug. 26, 2015, U.S. Appl. No. 14/836,063.
Steven Andrew Kellner et al., filed Jun. 16, 2015, U.S. Appl. No. 14/741,229.
Bret Dwayne Worden et al., filed Apr. 5, 2013, U.S. Appl. No. 13/857,334.
Bret Dwayne Worden et al., filed Aug. 1, 2013, U.S. Appl. No. 13/956,426.
Bret Dwayne Worden et al., filed Sep. 15, 2011, U.S. Appl. No. 13/233,856.
Mark Bradshaw Kraeling et al., filed Jan. 15, 2013, U.S. Appl. No. 13/741,649.
Eugene Smith et al., filed Feb. 1, 2017, U.S. Appl. No. 15/421,978.
Final Rejection towards U.S. Appl. No. 13/866,573 dated Jun. 29, 2017.
Foy, R. J. et al., "Automated set-up of a distributed power train," GE Co-Pending U.S. Appl. No. 60/792,428, filed Apr. 17, 2006.
Kellner, S. A. et al., "System and Method for Communicating in a Vehicle Consist," GE Co-Pending U.S. Appl. No. 62/049,524, filed Sep. 12, 2014.
PCT Search Report and Written Opinion issued in connection with related PCT Application No. PCT/US2007/066011 dated Oct. 2, 2007.
PCT International Preliminary Report on Patentability issued in connection with related PCT Application No. PCT/US2007/066011 dated Oct. 30, 2008.
U.S. Non-Final Office Action issued in connection with related U.S. Appl. No. 11/552,602 dated Mar. 26, 2010.
Unofficial English Translation of Chinese Office Action issued in connection with related CN Application No. 200780013958.2 dated Jul. 19, 2010.
U.S. Final Office Action issued in connection with related U.S. Appl. No. 11/552,602 dated Oct. 27, 2010.
Russian Office Action issued in connection with related RU Application No. 2008145039 dated Feb. 1, 2011.

(56) References Cited

OTHER PUBLICATIONS

U.S. Non-Final Office Action issued in connection with related U.S. Appl. No. 11/552,602 dated Jun. 7, 2011.
Mexican Office Action issued in connection with related MX Application No. MX/a/2008/013043 dated Jun. 16, 2011.
Unofficial English Translation of Chinese Office Action issued in connection with related CN Application No. 200780013958.2 dated Jul. 6, 2011.
Russian Office Action issued in connection with related RU Application No. 2008145039 dated Sep. 21, 2011.
U.S. Non-Final Office Action issued in connection with related U.S. Appl. No. 11/552,602 dated Nov. 16, 2011
Russian Decision on Grant issued in connection with related RU Application No. 2008145039 dated Apr. 13, 2012.
U.S. Notice of Allowance issued in connection with related U.S. Appl. No. 11/552,602 dated May 30, 2012.
Australian Examination Report issued in connection with related AU Application No. 2007238317 dated Dec. 7, 2012.
Canadian Office Action issued in connection with related CA Application No. 2648296 dated Feb. 25, 2013.
Australian Notice of Acceptance issued in connection with related AU Application No. 2007238317 dated Mar. 8. 2013.
U.S. Non-Final Office Action issued in connection with related U.S. Appl. No. 13/741,649 dated Oct. 20, 2014.
U.S. Notice of Allowance issued in connection with related U.S. Appl. No. 13/741,649 dated Apr. 24, 2015.
Chinese Office Action issued in connection with related CN Application No. 201310373253.9 dated Feb. 14, 2016.
Eurasian Search Report issued in connection with related EA Application No. 201591470 dated Mar. 9, 2016.
U.S. Non-Final Office Action issued in connection with related U.S. Appl. No. 14/741,229 dated Mar. 18, 2016.
U.S. Non-Final Office Action issued in connection with related U.S. Appl. No. 14/803,089 dated Apr. 8, 2016.
U.S. Non-Final Office Action issued in connection with related U.S. Appl. No. 14/520,585 dated Apr. 13, 2016.
Australian Examination Report issued in connection with related AU Application No. 2015218565 dated May 16, 2016.
Australian Examination Report issued in connection with related AU Application No. 2015243113 dated Jun. 28, 2016.
U.S. Final Office Action issued in connection with related U.S. Appl. No. 14/741,229 dated Aug. 18, 2016.
U.S. Non-Final Office Action issued in connection with corresponding U.S. Appl. No. 13/866,471 dated Sep. 23, 2016.
U.S. Final Office Action issued in connection with related U.S. Appl. No. 14/803,089 dated Oct. 21, 2016.
U.S. Non-Final Office Action issued in connection with corresponding U.S. Appl. No. 13/866,573 dated Dec. 15, 2016.
U.S. Notice of Allowance issued in connection with related U.S. Appl. No. 14/836,063 dated Feb. 7, 2017.
Australian Examination Report issued in connection with related AU Application No. 2013211559 dated Feb. 10, 2017.
Australian Notice of Acceptance issued in connection with related AU Application No. 2015243113 dated Apr. 18, 2017.
U.S. Notice of Allowance issued in connection with corresponding U.S. Appl. No. 13/866,471 dated May 8, 2017.

\* cited by examiner

SYSTEM AND METHOD FOR A COMPRESSOR

CROSS-REFERENCE TO RELATED APPLICATIONS

This application claims the benefit of U.S. Provisional Application Ser. No. 61/636,192, filed Apr. 20, 2012, and entitled "SYSTEM AND METHOD FOR A COMPRESSOR." The entirety of the aforementioned application is incorporated herein by reference.

BACKGROUND

Technical Field

Embodiments of the subject matter disclosed herein relate to air compressor diagnostics.

Discussion of Art

Compressors compress gas, such as air. Compressors may be driven by electric motors, and may be air cooled. Some compressors include three cylinders with two stages. For example, a compressor can have two low pressure cylinders which deliver an intermediate pressure air supply to a single high pressure cylinder for further compression for final delivery to an air reservoir. Compressor and compressor components are subject to various failure modes, which increase difficulties in maintaining a healthy compressor.

It may be desirable to have a system and method that differs from those systems and methods that are currently available.

BRIEF DESCRIPTION

In an embodiment, a method (e.g., method for operating and/or controlling a compressor) comprises monitoring a pressure of compressed air within a reservoir of a compressor, and actuating a piston within a cylinder of the compressor. The method further comprises detecting a leak condition of an exhaust valve of the cylinder through recognition of a change in the monitored pressure of the compressed air within the reservoir during a time period in which the piston is actuated. (In other embodiments, the method further comprises automatically or otherwise controlling the compressor based on, and/or responsive to, the leak condition that is detected. In still other embodiments, alternatively or additionally, the method is carried out automatically or otherwise by a controller.)

Another embodiment relates to a controller that is operable in association with a compressor (e.g., the controller may receive data from and/or about the compressor, diagnose a condition based on the data, and control the compressor based on the condition that is diagnosed). The controller is configured to receive a signal corresponding to a monitored pressure of compressed air within a reservoir of a compressor. The compressor is further configured to detect a leak condition of an exhaust valve of a cylinder of the compressor through recognition of a change in the monitored pressure of the compressed air within the reservoir during a time period in which a piston is actuated within the cylinder.

In another embodiment, a system comprises a compressor operatively connected to an engine, wherein the compressor includes a reservoir configured to store compressed air. The system further comprises a controller that is operable to determine a condition of the compressor. The controller is configured to receive a signal corresponding to a monitored pressure of compressed air within the reservoir, and detect a leak condition of an exhaust valve of a cylinder of the compressor through recognition of a change in the monitored pressure of the compressed air within the reservoir during a time period in which a piston is actuated within the cylinder.

In another embodiment, a compressor system comprises means for monitoring a pressure of compressed air within a reservoir, and means for actuating a piston within a cylinder. The compressor system further comprises means for detecting a leak condition of an exhaust valve of the cylinder through recognition of a change in the monitored pressure of the compressed air within the reservoir during a time period in which the piston is actuated.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
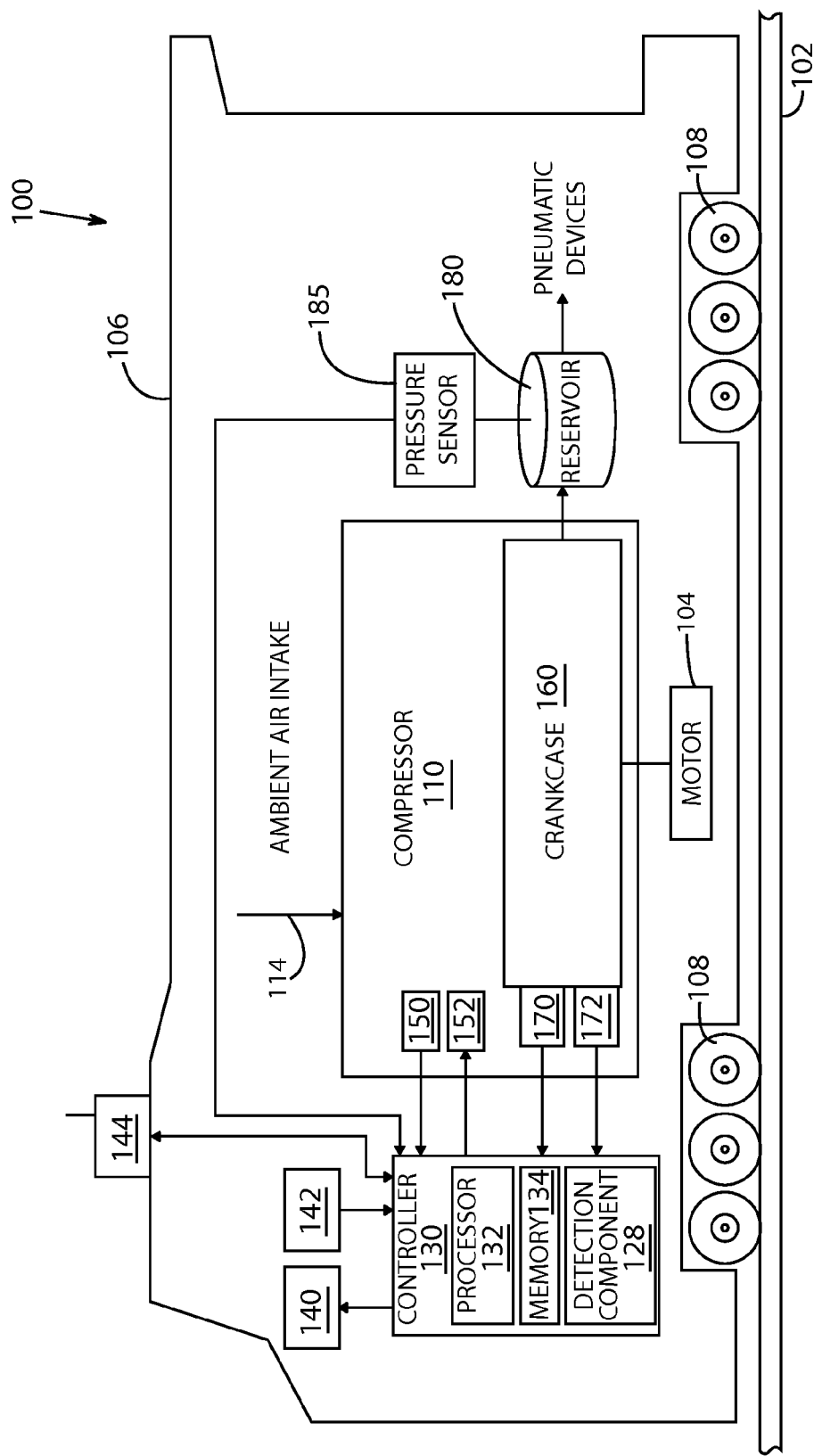
FIG. 1 is an illustration of an embodiment of a vehicle system with a compressor.

Embodiments of the subject matter disclosed herein relate to systems and methods that facilitate identifying a leak condition within a compressor and, in particular, identifying a leak condition by monitoring a pressure while actuating a piston. A controller can be configured to actuate a piston for a compressor while maintaining pressure within a reservoir. Moreover, a pressure sensor (e.g., also referred to more generally as a detection component) can be configured to monitor pressure in the reservoir, for purpose of detecting a change (e.g., a fluctuation, increase, decrease, among others) in the monitored pressure. Based upon a detected change in the monitored pressure, the controller can be configured to detect a leak condition associated with the detected change in pressure. In an embodiment, the controller can be further configured to communicate an alert related to the detected change in the pressure of the reservoir during the piston actuation. The alert can be a signal (e.g., diagnostic code, audio, text, visual, haptic, among others) that indicates a change in the monitored pressure of the reservoir of the compressor. This alert can be utilized to provide maintenance on the compressor or a portion thereof. In an embodiment, the controller can be configured to schedule a maintenance operation based upon the detected change in pressure and/or the communicated alert in order to perform preventative maintenance. Further, the controller may be configured to automatically control the compressor based on a leak condition that is detected, e.g., a duty cycle of the compressor may be automatically reduced.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "vehicle" as used herein can be defined as any asset that is a mobile machine that transports at least one of a person, people, or a cargo, or that is configured to be portable from one location to another. For instance, a vehicle can be, but is not limited to being, a locomotive or other rail vehicle, an intermodal container, a marine vessel, a mining equipment, a stationary portable power generation equipment, an industrial equipment, a construction equipment, and the like. The term "loaded" as used herein can be defined as a compressor system mode where air is being compressed into the reservoir. The term "loaded start" as used herein can be defined as a compressor system mode in a loaded condition during a starting phase of the compressor. The term "unloaded" as used herein can be defined as a compressor system mode where air is not being compressed into the reservoir.

A compressor compresses gas, such as air. In some embodiments, the compressed gas is supplied to operate pneumatic or other equipment powered by compressed gas. A compressor may be used for mobile applications, such as vehicles. By way of example, vehicles utilizing compressors include locomotives, on-highway vehicles, off-highway vehicles, mining equipment, and marine vessels. In other embodiments, a compressor may be used for stationary applications, such as in manufacturing or industrial applications requiring compressed air for pneumatic equipment among other uses. The compressor depicted in the below figures is one which utilizes spring return inlet and discharge valves for each cylinder, wherein the movement of these valves is caused by the differential pressure across each cylinder as opposed to a mechanical coupling to the compressor crank shaft. The subject invention can be applicable to machines with either type of valve (e.g., spring return valves, mechanical coupled valves, among others) and the spring return valve is depicted solely for example and not to be limiting on the subject innovation.

The components of a compressor may degrade over time resulting in performance reductions and/or eventual failure of the compressor. In vehicle applications, for example, a compressor failure may produce a road failure resulting in substantial costs to the vehicle owner or operator. In this context, a road failure includes a vehicle, such as a locomotive, becoming inoperative when deployed in service as a result of the failure or degradation of a compressor system that prevents operation or requires shutting down the vehicle until repairs can be made. Prior to a total failure, the detection of degraded components or other deterioration of the compressor may be used to identify incipient faults or other conditions indicative of deterioration. In response to detecting such conditions, remedial action may be taken to mitigate the risk of compressor failure and associated costs.

The systems and methods presently disclosed can also be used to diagnose and/or prognose problems in a compressor prior to total compressor failure. If deterioration or degradation of the compressor is detected in the system, action can be taken to reduce progression of the problem and/or further identify the developing problem. In this manner, customers realize a cost savings by prognosing compressor problems in initial stages to reduce the damage to compressor components and avoid compressor failure and unplanned shutdowns. Moreover, secondary damage to other compressor components (e.g., pistons, valves, liners, and the like) or damage to equipment that relies upon the availability of the compressed gas from the compressor may be avoided if compressor problems are detected and addressed at an early stage.

Figure 2:
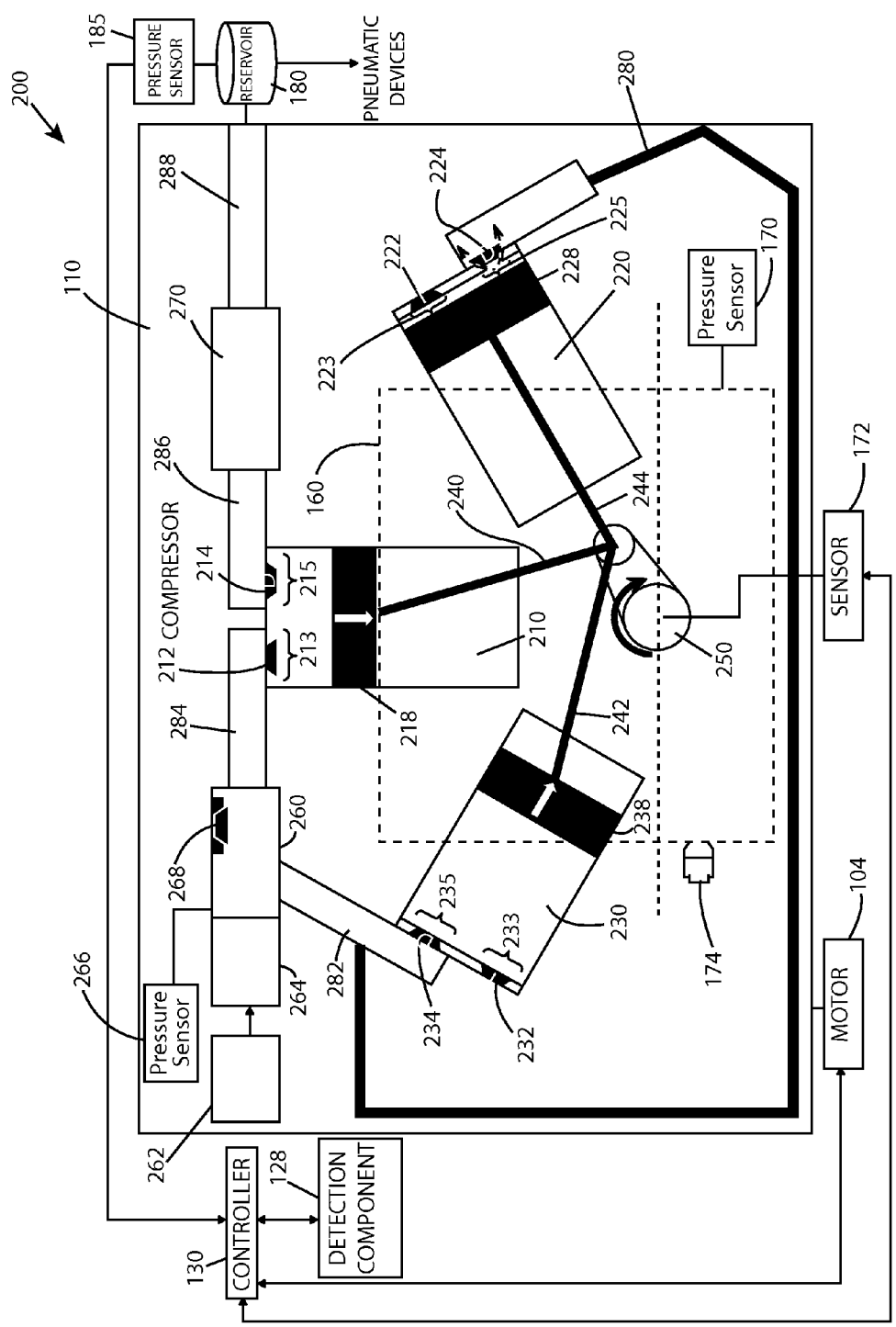
FIG. 2 is an illustration of an embodiment of system that includes a compressor.

FIG. 1 illustrates a block diagram of an embodiment of a vehicle system 100. The vehicle system 100 is depicted as a rail vehicle 106 (e.g., locomotive) configured to run on a rail 102 via a plurality of wheels 108. The rail vehicle includes a compressor system with a compressor 110. In an embodiment, the compressor is a reciprocating compressor that delivers air at high pressure. In another embodiment, the compressor is a reciprocating compressor with a bi-directional drive system that drives a piston in a forward direction and the reverse direction. In an embodiment, the compressor receives air from an ambient air intake 114. The air is then compressed to a pressure greater than the ambient pressure and the compressed air is stored in reservoir 180, which is monitored by a reservoir pressure sensor 185. In one embodiment, the compressor is a two-stage compressor (such as illustrated in FIG. 2) in which ambient air is compressed in a first stage to a first pressure level and delivered to a second stage, which further compresses the air to a second pressure level that is higher than the first pressure level. The compressed air at the second pressure level is stored in a reservoir. The compressed air may then be provided to one or more pneumatic devices as needed. In other embodiments, the compressor 110 may be a single stage or multi-stage compressor.

The compressor includes a crankcase 160. The crankcase is an enclosure for a crankshaft (not shown in FIG. 1) connected to cylinders (not shown in FIG. 1) of the compressor. A motor 104 (e.g., electric motor) is employed to rotate the crankshaft to drive the pistons within the cylinders. In another embodiment, the crankshaft may be coupled to a drive shaft of an engine or other power source configured to rotate the crankshaft of the compressor. In each embodiment, the crankshaft may be lubricated with compressor oil that is pumped by an oil pump (not shown) and sprayed onto the crankshaft. The crankshaft is mechanically coupled to a plurality of pistons via respective connecting rods. The pistons are drawn and pushed within their respective cylinders as the crankshaft is rotated to compress a gas in one or more stages.

The rail vehicle further includes a controller 130 for controlling various components related to the vehicle system. In an embodiment, the controller is a computerized control system with a processor 132 and a memory 134. The memory may be computer readable storage media, and may include volatile and/or non-volatile memory storage. In an embodiment, the controller includes multiple control units and the control system may be distributed among each of the control units. In yet another embodiment, a plurality of controllers may cooperate as a single controller interfacing with multiple compressors distributed across a plurality of vehicles. Among other features, the controller may include instructions for enabling on-board monitoring and control of vehicle operation. Stationary applications may also include a controller for managing the operation of one or more compressors and related equipment or machinery.

In an embodiment, the controller receives signals from one or more sensors 150 to monitor operating parameters and operating conditions, and correspondingly adjust actuators 152 to control operation of the rail vehicle and the compressor. In various embodiments, the controller receives signals from one or more sensors corresponding to compressor speed, compressor load, boost pressure, exhaust pressure, ambient pressure, exhaust temperature, or other parameters relating to the operation of the compressor or surrounding system. In another embodiment, the controller receives a signal from a crankcase pressure sensor 170 that corresponds to the pressure within the crankcase. In yet another embodiment, the controller receives a signal from a crankshaft position sensor 172 that indicates a position of the crankshaft. The position of the crankshaft may be identified by the angular displacement of the crankshaft relative to a known location such that the controller is able to determine the position of each piston within its respective cylinder based upon the position of the crankshaft. In some embodiments, the controller controls the vehicle system by sending commands to various components. On a locomotive, for example, such components may include traction motors, alternators, cylinder valves, and throttle controls among others. The controller may be connected to the sensors and actuators through wires that may be bundled together into one or more wiring harnesses to reduce space in vehicle system devoted to wiring and to protect the signal wires from abrasion and vibration. In other embodiments, the controller communicates over a wired or wireless network that may allow for the addition of components without dedicated wiring.

The controller may include onboard electronic diagnostics for recording operational characteristics of the compressor. Operational characteristics may include measurements from sensors associated with the compressor or other components of the system. Such operational characteristics may be stored in a database in memory. In one embodiment, current operational characteristics may be compared to past operational characteristics to determine trends of compressor performance.

The controller may include onboard electronic diagnostics for identifying and recording potential degradation and failures of components of vehicle system. For example, when a potentially degraded component is identified, a diagnostic code may be stored in memory. In one embodiment, a unique diagnostic code may correspond to each type of degradation that may be identified by the controller. For example, a first diagnostic code may indicate a malfunctioning exhaust valve of a cylinder, a second diagnostic code may indicate a malfunctioning intake valve of a cylinder, a third diagnostic code may indicate deterioration of a piston or cylinder resulting in a blow-by condition. Additional diagnostic codes may be defined to indicate other deteriorations or failure modes. In yet other embodiments, diagnostic codes may be generated dynamically to provide information about a detected problem that does not correspond to a predetermined diagnostic code. In some embodiments, the controller modifies the output of charged air from the compressor, such as by reducing the duty cycle of the compressor, based on parameters such as the condition or availability of other compressor systems (such as on adjacent locomotive engines), environmental conditions, and overall pneumatic supply demand.

The controller may be further linked to display 140, such as a diagnostic interface display, providing a user interface to the operating crew and/or a maintenance crew. The controller may control the compressor, in response to operator input via user input controls 142, by sending a command to correspondingly adjust various compressor actuators. Non-limiting examples of user input controls may include a throttle control, a braking control, a keyboard, and a power switch. Further, operational characteristics of the compressor, such as diagnostic codes corresponding to degraded components, may be reported via display to the operator and/or the maintenance crew.

The vehicle system may include a communications system 144 linked to the controller. In one embodiment, communications system may include a radio and an antenna for transmitting and receiving voice and data messages. For example, data communications may be between vehicle system and a control center of a railroad, another locomotive, a satellite, and/or a wayside device, such as a railroad switch. For example, the controller may estimate geographic coordinates of a vehicle system using signals from a GPS receiver. As another example, the controller may transmit operational characteristics of the compressor to the control center via a message transmitted from communications system. In one embodiment, a message may be transmitted to the command center by communications system when a degraded component of the compressor is detected and the vehicle system may be scheduled for maintenance.

As discussed above, the term "loaded" refers to a compressor mode where air is being compressed into the reservoir. The compressor depicted is one which utilizes spring return inlet and discharge valves for each cylinder in which the movement of these valves is caused by the differential pressure across them as opposed to a mechanical coupling to the compressor crank shaft. The subject disclosure may be applicable to machines with either type of valve, but the spring return type will be illustrated here for the sake of brevity.

The controller can be configured to adjust at least one of the following: an operation of the compressor; a scheduled maintenance for the compressor; a maintenance for the compressor; a service for the compressor; a diagnostic code of the compressor; an alert for the compressor; among others. In an embodiment, the controller can be configured to adjust the compressor based upon a detection of a change in pressure for the reservoir during an actuation of the piston. In a more particular embodiment, the controller can be configured to adjust the compressor based upon a monitored change in pressure in combination with a position of a piston of the compressor.

The compressor 110 can include a detection component 128 that can be configured to detect at least one of a pattern, a signature, a level, among others related to a pressure measured, wherein such detection is indicative of a leak condition for the compressor. In particular, the leak condition can relate to a leak (e.g., exhaust valve leak, among others) from the reservoir of the compressor (discussed in more detail below). The detection component and/or the pressure sensor (e.g., pressure sensor 185) can be employed with the compressor to collect data that is indicative of a leak condition. In an embodiment, the controller can be configured to adjust the compressor based upon the detection component and/or the pressure sensor.

The detection component can be a stand-alone component (as depicted), incorporated into the controller component, or a combination thereof. The controller component can be a stand-alone component (as depicted), incorporated into the detection component, or a combination thereof. In another embodiment, the detection component and/or the pressure sensor can be a stand-alone component (as depicted), incorporated into the controller component, or a combination thereof.

FIG. 2 illustrates a detailed view of the compressor set forth in FIG. 1 above. The compressor includes three cylinders 210, 220, 230. Each cylinder contains a piston 218, 228, 238 that is coupled to a crankshaft 250 via connecting rods 240, 242, 244. The crankshaft is driven by the motor to cyclically pull the respective pistons to a Bottom-Dead-Center (BDC) and push the pistons to a Top-Dead-Center (TDC) to output charged air, which is delivered to the reservoir via air lines 280, 282, 284, 286. In this embodiment, the compressor is divided into two stages: a low pressure stage and a high pressure stage to produce charged air in a stepwise approach. The low pressure stage compresses air to a first pressure level which is further compressed by the high pressure stage to a second pressure level. In this example, the low pressure stage includes cylinders 220, 230 and the high pressure stage includes cylinder 210.

In operation, air from the ambient air intake is first drawn into the low pressure cylinders via intake valves 222, 232, which open and close within intake ports 223, 233. The ambient air is drawn in as the low pressure cylinders are pulled towards BDC and the intake valves 222, 232 separate from intake ports 223, 233 to allow air to enter each cylinder 220, 230. Once the pistons reach BDC, the intake valves 222, 232 close the intake ports 223, 233 to contain air within each cylinder. Subsequently, pistons 228, 238 are pushed toward TDC, thereby compressing the ambient air initially drawn into the cylinders. Once the cylinders have compressed the ambient air to a first pressure level, exhaust valves 224, 234 within exhaust ports 225, 235 are opened to release the low pressure air into low pressure lines 280, 282.

The air compressed to a first pressure level is routed to an intermediate stage reservoir 260. The intermediate stage reservoir 260 received air from one stage of a multistage compressor and provides the compressed air to a subsequent stage of a multistage compressor. In an embodiment, the intermediate stage reservoir 260 is a tank or other volume connected between successive stages by air lines. In other embodiments, the air lines, such as low pressure lines 280, 282 provide sufficient volume to function as an intermediate stage reservoir without the need for a tank or other structure.

In an embodiment, the compressor system also includes an intercooler 264 that removes the heat of compression through a substantially constant pressure cooling process. One or more intercoolers may be provided along with one or more intercooler controllers 262. In some embodiments, the intercooler 264 is integrated with the intermediate stage reservoir 260. A decrease in the temperature of the compressed air increases the air density allowing a greater mass to be drawn into the high pressure stage increasing the efficiency of the compressor. The operation of the intercooler is controlled by the intercooler controller 262 to manage the cooling operation. In an embodiment, the intercooler controller 262 employs a thermostatic control through mechanical means such as via thermal expansion of metal. In a multistage compressor system having more than two stages, an intercooler may be provided at each intermediate stage.

The air at a first pressure level (e.g., low pressure air) is exhausted from the intercooler into low pressure air line 284 and subsequently drawn into the high pressure cylinder 210. More particularly, as piston 218 is pulled toward BDC, the intake valve 212 opens, thereby allowing the low pressure air to be drawn into the cylinder 210 via intake port 213. Once the piston 218 reaches BDC, the intake valve 212 closes to seal the low pressure air within the cylinder 210. The piston is then pushed upward thereby compressing the low pressure air into high pressure air. High pressure air is air at a second pressure level greater than the first pressure level, however the amount of compression will vary based upon the requirements of the application. As compression increases, the exhaust valve 214 is opened to allow the high pressure air to exhaust into high pressure line 286 via exhaust port 215. An aftercooler 270 cools the high pressure air to facilitate a greater density to be delivered to the reservoir via high pressure air line 288.

The above process is repeated cyclically as the crankshaft 250 rotates to provide high pressure air to the reservoir 180, which is monitored by the reservoir pressure sensor 185. Once the reservoir reaches a particular pressure level (e.g., 140 psi), the compressor operation is discontinued.

In some embodiments, the compressor includes one or more valves configured to vent compressed air from intermediate stages of the compressor system. The unloader valves and/or relief valves may be operated after compressor operations are discontinued, or may be operated during compressor operations to relieve pressure in the compressor system. In an embodiment, an unloader valve 268 is provided in the intermediate stage reservoir 260 and configured to vent the low pressure compressed air from the intermediate stage reservoir, low pressure air lines 280, 282 and intercooler 264. Venting compressed air reduces stress on system components during periods when the compressor is not in use and may extend the life of the system. In another embodiment, the unloader valve 268 operates as a relief valve to limit the buildup of pressure in the intermediate stage reservoir 260. In yet another embodiment, intake valves 222, 232 operate as unloader valves for the cylinders 220, 230 allowing compressed air in the cylinders to vent back to the ambient air intake 114. In another embodiment, the system 200 can include relief valves such as breather valve 174, a relieve valve on the intercooler 264 (shown in FIG. 4), a relieve valve for air line 286, a rapid unloader valve on the intercooler 264 (shown in FIG. 4)

A compressor, such as the compressor illustrated in FIG. 2, operates to charge the reservoir 180 with compressed air or other gas. Once the compressor charges the reservoir to a determined pressure value the compressor operation is discontinued. In some embodiments, when compressor operations are discontinued, one or more unloader valves are opened to vent intermediate stages of the compressor to the atmosphere. The intake valves of the cylinders as well as unloader valves of the intermediate stage reservoirs may all operate as unloader valves to vent the cylinders of the compressor to the atmosphere. Once the unloader valves are actuated and the cylinders and intermediate stages of the compressor have been vented to the atmosphere the pressure within the reservoir is expected to remain constant as previously discussed.

The crankshaft can include a first end opposite a second end in which the first end is coupled to one or more connecting rods for each respective cylinder. The crankshaft, cylinders, and pistons can be in a BDC position based upon the location of the first end. BDC position is a location of the first end at approximately negative ninety degrees (−90 degrees) or 270 degrees. It is to be appreciated that the first end is illustrated in FIG. 2 at approximately thirty degrees (30 degrees). A TDC position is a location of the first end at approximately ninety degrees (90 degrees) or −270 degrees.

As discussed above, the controller can be configured to employ an adjustment to the compressor based upon at least one of a detected change of pressure in the reservoir or a detected change of pressure in the reservoir during an actuation of piston. In embodiment, the pressure sensor can monitor a pressure for the reservoir with or without a cycling of a piston. Upon detection of a change in the pressure, the controller can implement an adjustment to the compressor and/or communicate an alert based on the detected change.

Figure 3:
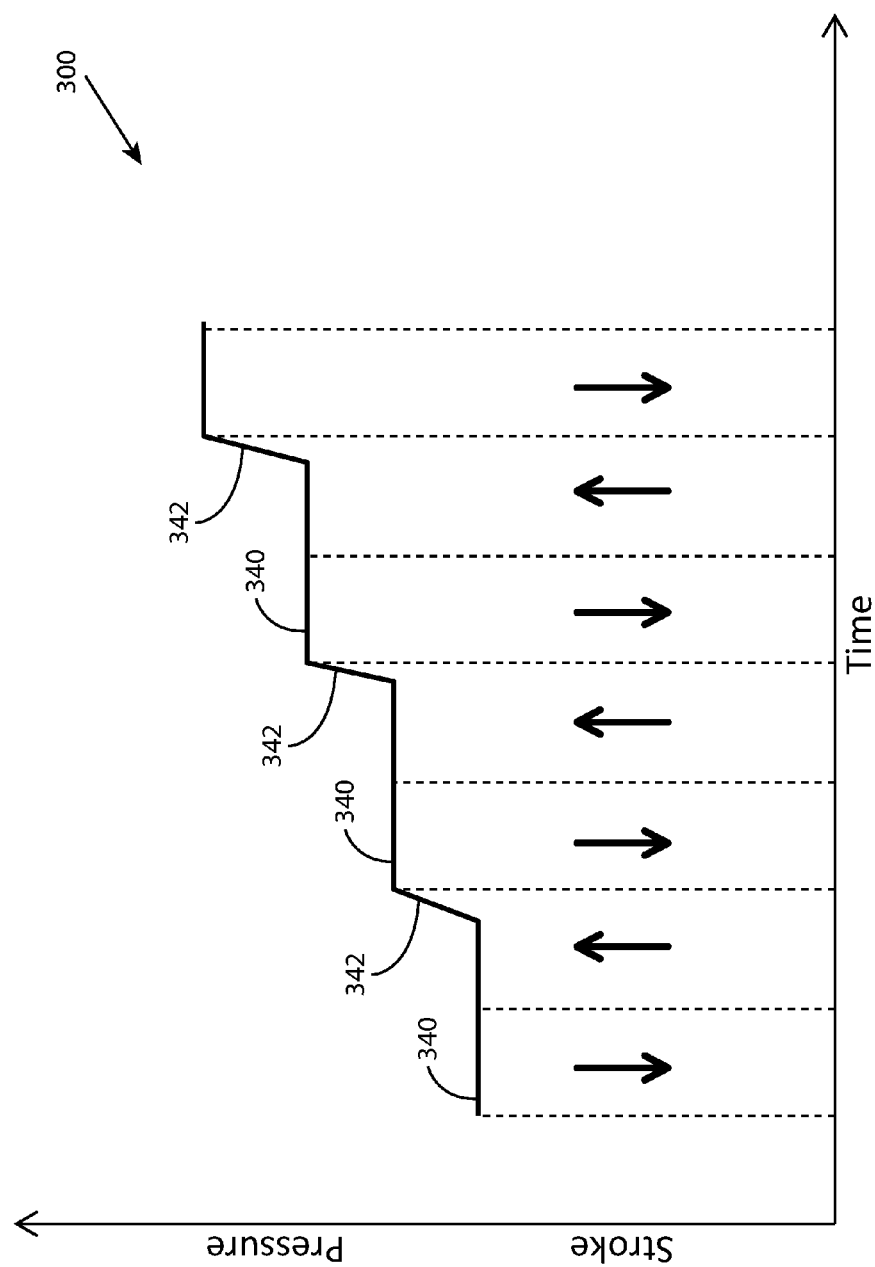
FIG. 3 is a graph that illustrates a measured pressure over time with indication of a compression stroke or a suction stroke for a compressor.
Figure 4:
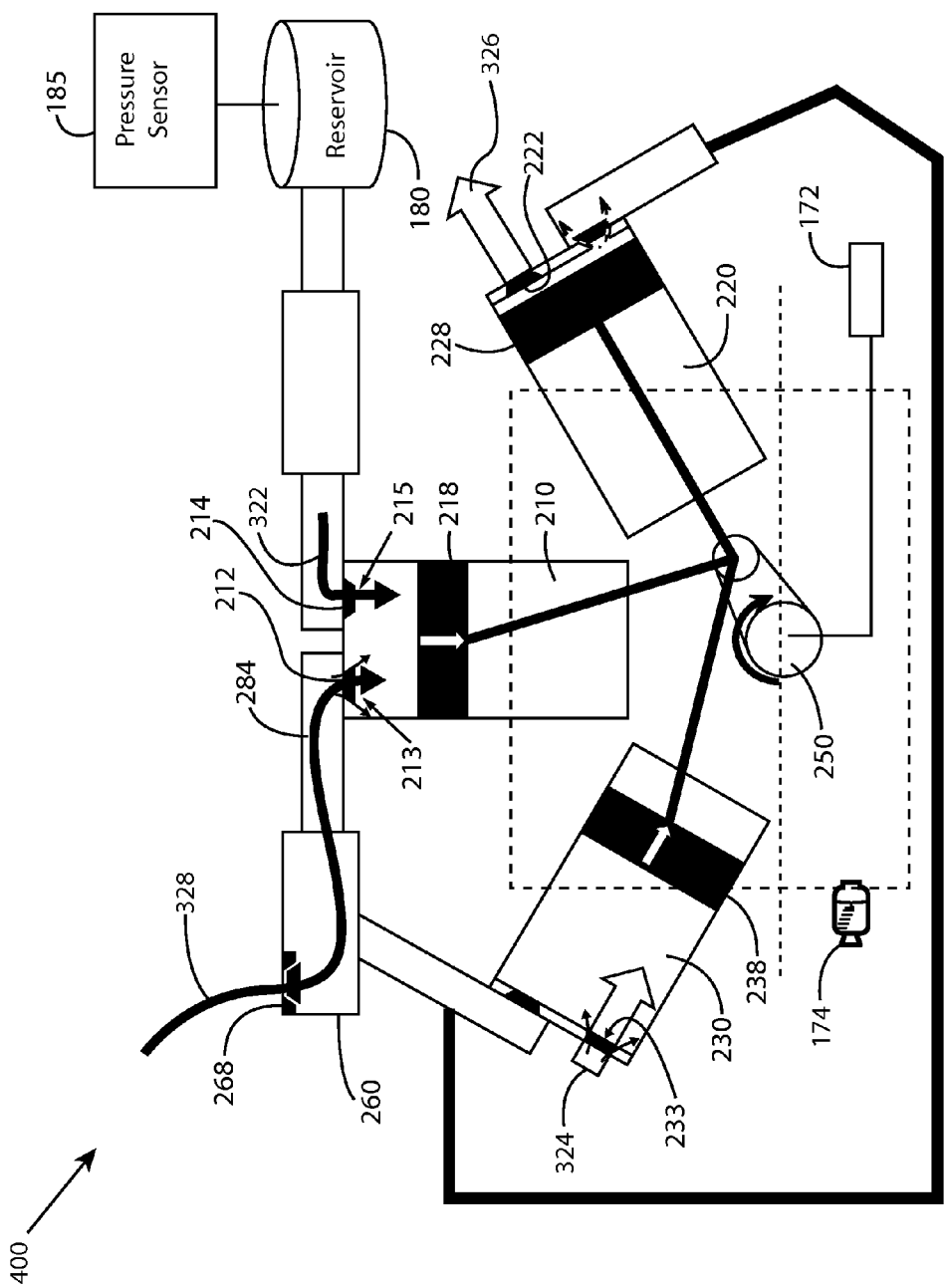
FIG. 4 is an illustration of an embodiment of a system that includes a compressor.
Figure 5:
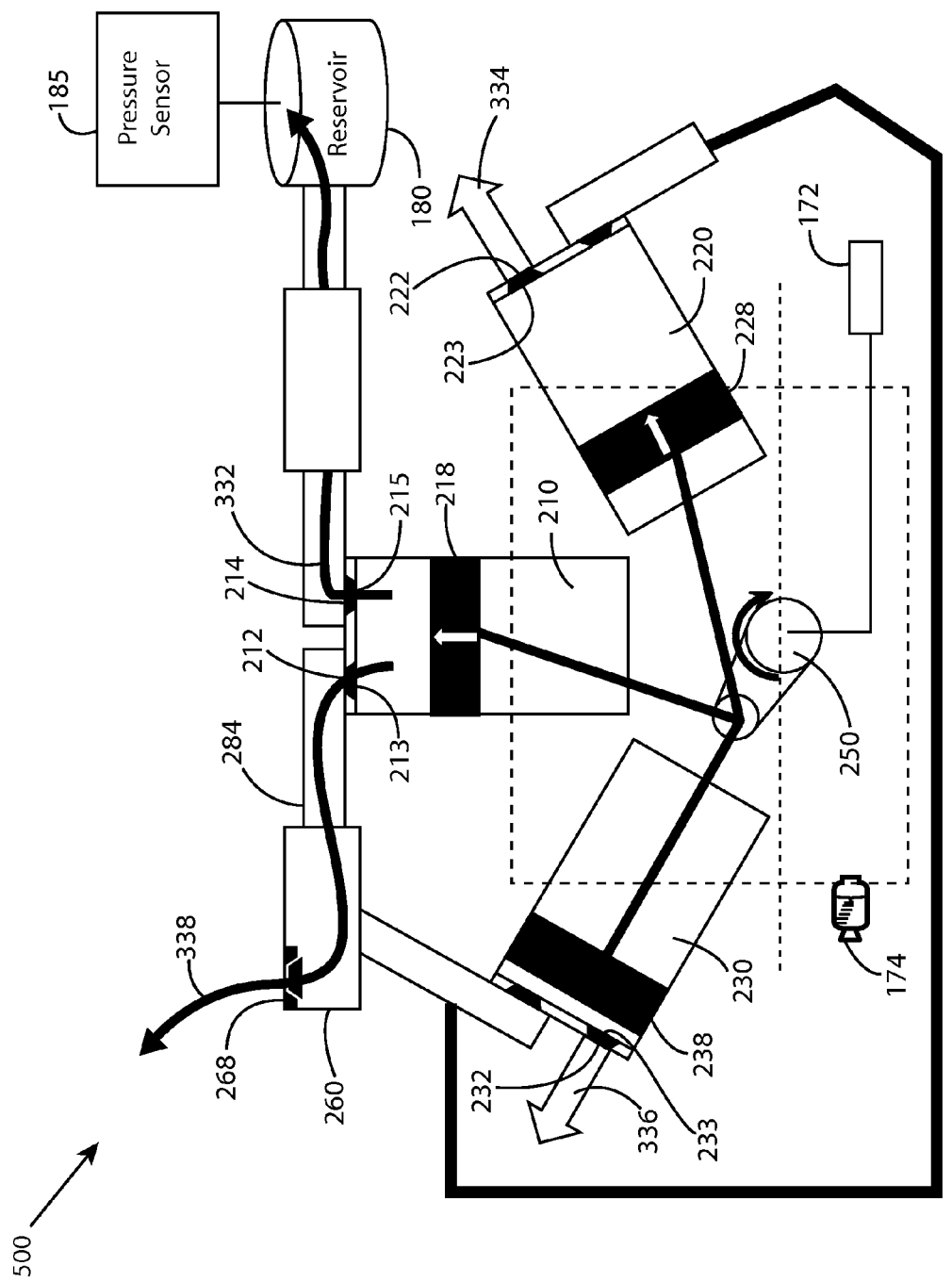
FIG. 5 is an illustration of an embodiment of a system that includes a compressor.

Referring now to FIGS. 3-5, an aspect of a method for a compressor is illustrated. A compressor, such as the compressor illustrated in FIGS. 1 and 2, operates to charge a reservoir 180 with compressed air or other gas. Once the compressor charges the reservoir to a determined pressure value the compressor operation is discontinued. In some embodiments, when compressor operations are discontinued, one or more unloader valves are opened to vent intermediate stages of the compressor to the atmosphere. The intake valves of the cylinders as well as unloader valves of the intermediate stage reservoirs may all operate as unloader valves to vent the cylinders of the compressor to the atmosphere. Once the unloader valves are actuated and the cylinders and intermediate stages of the compressor have been vented to the atmosphere the pressure within the reservoir is expected to remain constant as previously discussed.

In an embodiment, a method of diagnosing a compressor includes monitoring a pressure of compressed air within a reservoir, actuating a piston within a cylinder of the compressor, and detecting a leak condition of an exhaust valve of the cylinder through recognition of a change in the monitored pressure of the compressed air within the reservoir during a time period in which the piston is actuated. A leak condition of the exhaust valve 214 of the cylinder 210 may be detected by correlating the monitored pressure of the compressed air within the reservoir 180 with an indication of a position of the piston 218 within the cylinder 210. Turning to FIG. 3, graph 300 illustrates compression strokes and measured pressure over time. During normal or loaded operation of the compressor, on each compression stroke (↑) of the high pressure cylinder 210, the measured pressure 342 in the reservoir 180 increases as an additional mass of compressed air is forced through the exhaust port 215 and into the reservoir 180. During each suction stroke (↓), the exhaust port 215 is closed and the measured pressure 340 within the reservoir 180 is expected to remain constant. As such, the measured reservoir pressure is expected to increase in a generally step-wise fashion once per revolution of the piston 218. Thus, during loaded operation of the compressor a change in the monitored pressure, or lack of change, correlated with each compression stroke may indicate faulty operation of the compressor.

In another embodiment, the piston is actuated by cycling the piston within the cylinder with the compressor in an unloaded condition. The unloaded condition is maintained by opening one or more of the unloader valves to vent the cylinders and intermediate stage reservoir, if present, to the atmosphere. In an unloaded condition, the crankshaft 250 of the compressor rotates causing the pistons 218, 228, 238 to move within their respective cylinders, however, air flows into and out of the cylinders through the open unloader valves.

As shown in FIG. 4, a system 400 is depicted. During the suction stroke of the piston 238, an air flow 324 enters cylinder 230 through intake port 233. Similarly, during the compression stroke of piston 228, an air flow 326 exits cylinder 220 through intake port 223. In this embodiment, the intake valves 222, 232 function as unloader valves for their respective cylinders. Regarding cylinder 210, the piston 218 is illustrated during a suction stroke resulting in the air flow 328 being drawn into the cylinder 210 through the unloader valve 268, the intermediate stage reservoir 260, and intake port 213.

During unloaded operations, the exhaust port 215 and exhaust valve 214 of the cylinder 210 are expected to remain closed to maintain a closed volume and constant pressure within the reservoir, provided air is not currently being supplied from the reservoir 180 to pneumatic devices. If the exhaust port 215 and/or exhaust valve 214 are degraded, such as by corrosion or wear, the exhaust valve may not maintain an air tight seal during unloaded operations and compressed air may leak from the reservoir back through the exhaust port 215 into the cylinder 210. Depending upon the pressure within the reservoir and the nature of the degradation of the exhaust value or exhaust port, a leak may be intermittent or difficult to identify.

In an embodiment, a leak condition of the exhaust valve 214 is detected by correlating the monitored pressure of the compressed air within the reservoir with an indication of a position of the piston within the cylinder. During the suction stroke, a reduced pressure is created in the cylinder 210. The reduced pressure is transitory in nature as the inflow of air through the intake port will restore the pressure within the cylinder to atmospheric pressure. During the period of reduced pressure, however, an exhaust valve 214 with a sufficient leak condition will allow air flow 322 from the reservoir into the cylinder. The air flow 322 results in a decrease in the reservoir pressure as air is drawn out of the reservoir. Such air flow 322 may occur even if the exhaust valve 214 does not demonstrate a leak under static conditions.

Referring to FIG. 5, a system 500 that illustrates a compressor during a compression stroke is provided. During the compression stroke of the piston 218 an increased pressure is created in the cylinder 210. In a similar manner as described above, the increased pressure is transitory in nature as the air flow 338 out through the intake port 213 and through the unloader valve 268 restores the pressure within the cylinder to atmospheric pressure. During the period of increased pressure, however, an exhaust valve 214 with a sufficient leak condition will allow air flow 332 from the cylinder 210 through the exhaust port 215 and into the reservoir 180 resulting in an increase in reservoir pressure. Such air flow 332 may also occur even if the exhaust valve 214 does not demonstrate a leak condition under static conditions, or when cycling the unloader valve as described above. Depending upon the configuration of the compressor system, during the compression stroke of the piston 218, the pistons 228, 238 may be in various stages of their respective rotations. As shown in FIG. 5, the piston 228 had reached top dead center resulting in an air flow 334 out of cylinder 220 through intake port 223. The piston 238 may be traversing a compression stroke as shown resulting in an air flow 336 out of cylinder 230 through intake port 233. In this manner, the intake valves 222, 232 continue to function as unloader valves for their respective cylinders.

In some embodiments, the increase and decrease in reservoir pressure corresponding to compression and suction strokes of piston 218 are detectable even when the air flows 322 (as seen in FIG. 4) and 332 (as seen in FIG. 5) are not individually identifiable. In an embodiment, the piston 218 is cycled at a known rate and a once-per-revolution signature identified in a frequency analysis of the monitored pressure data, corresponding to an exhaust valve leak during either the suction or compression stroke. In other embodiments, a twice-per-revolution signature may be identified if the exhaust valve leaks during both the suction and compression strokes of the piston. The rate at which the piston is cycled may be varied such that the frequency components corresponding to the leak may be adjusted to facilitate detection of the leak condition. In one example, the piston 218 is cycled at a first rate during a first portion of the time period and cycled at a second rate during a second portion of the time period. By comparing the measured reservoir pressure data, in either the time domain or the frequency domain, for each of the two time periods, noise or other variation in the measured reservoir pressure may be accounted for such that the variation corresponding to the piston movement is isolated. In other embodiments, the measured reservoir pressure may be affected by vibrations or noise from the compressor environment or other distortions caused by surrounding equipment. In such environments, cycling the piston at two or more different rates may enable identification of leaks that would otherwise have been masked. In addition, the piston 218 may be cycled at rates less than the sample rate of the monitored pressure in order to provide sufficient detection of pressure changes correlated with the movement of the piston. In this manner, both time domain and frequency domain analysis of the measured reservoir pressure may be used to identify a leak condition of an exhaust valve.

In some embodiments, the leakage through exhaust valve 214 may be dependent upon reservoir pressure. When the reservoir pressure is high, air flow 332 from the cylinder 210 into reservoir 180 may be inhibited, however, air flow 322 from the reservoir 180 into the cylinder 210 may still result. When reservoir pressure is low, air flow 322 from the reservoir 180 into cylinder 210 may not result, but air flow 332 from the cylinder 210 into the reservoir 180 may be detected. As a result, in some embodiments, a method of diagnosing a compressor includes filling the reservoir with compressed air to a determined pressure value prior to cycling the piston as discussed above. Just as the rate at which the piston is cycled may be varied to assist in detecting leak conditions, the diagnostic method may be performed at more than one reservoir pressure level to detect leaks under varying condition.

In yet another embodiment, a controller is provided to determine the condition of a compressor. The controller is configured to receive a signal corresponding to a monitored pressure of compressed air within a reservoir of the compressor, and detect a leak condition of an exhaust valve of a cylinder of the compressor through recognition of a change in the monitored pressure of the compressed air within the reservoir during a time period in which a piston actuated within the cylinder. In an embodiment, the controller is integral with a vehicle system, such as controller 130. In yet another embodiment, the controller is provided with a test kit used for maintenance and repair or diagnostic operations. In this manner, the controller may be further configured to actuate the piston within the cylinder of the compressor during at least a portion of the time period.

In various embodiments, the controller may interface with controller 130, compressor actuators 152, or motor 104 to actuate the piston. In addition, the controller is configured to communicate with one or more reservoir pressure sensors 185 and receive the signal corresponding to the monitored pressure. The controller may also correlate the signal corresponding to the monitored pressure of the compressed air within the reservoir with an indication of a position of the piston in the cylinder of the compressor. The position of the piston may be indicated by the rotational position of the crankshaft or the motor, or by a sensor configured to identify the position of a piston within a cylinder of the compressor. In one embodiment, the crankshaft position sensor 172 is used to determine the position of a piston in the cylinder.

In order to evaluate the health of the compressor under various operating conditions, the controller may be configured to actuate the piston within the cylinder of a reciprocating compressor in a loaded or unloaded condition. The controller is further configure to recognize a reduction in the monitored pressure corresponding to a suction stroke of the piston in the cylinder and to recognize an increase in the monitored pressure corresponding to a compression stroke of the piston in the cylinder as previously discussed. The controller may also be configured to perform frequency domain analysis on the monitored pressure data during the time period in which the piston is actuated. In some embodiments, the controller includes a digital signal processor capable of analyzing the frequency components of the monitored pressure data. In this manner, the controller implements a diagnostic method and is configured to generate diagnostic information for the compressor.

Upon detecting a leak or potential fault in the compressor system, a variety of steps may be taken to reduce further degradation of the components and facilitate repair. In an embodiment, a signal is generated in response to recognizing a change in the monitored pressure of the compressed air within the reservoir during a time period in which the piston is actuated. The generated signal may be indicative of a severity level of the leak condition of the exhaust valve, where the severity level corresponds to the change in the monitored pressure when the piston is actuated. In an embodiment, in response to the signal, the duty cycle of the compressor is reduced in order to reduce further degradation of the compressor until repairs can be made. The duty cycle may be reduced by a fixed amount, such as by 25%, 50% or more, or may be reduced in proportion to the severity of the identified failure. If the leak condition is severe, power to the compressor may be disconnected such that the compressor ceases operating until appropriate repairs have been effected. In another embodiment, personnel are notified by an audio alarm, a visual alarm, a text message, an email, an instant message, a phone call, or other method appropriate for the operating environment. In a system having multiple compressors, in response to a detected leak on one compressor the operation of the other compressors may be adjusted to compensate for the reduced performance of the leaking compressor allowing the system to remain functional until repairs can be scheduled.

In various other embodiments, the aspects of the systems and methods previously described may also be employed individually or in combination to diagnose the condition of a compressor. In one embodiment, a method for diagnosing a compressor includes operating a compressor in an unloaded condition by cycling the pistons within their respective cylinders, monitoring at least the reservoir pressure and the crankcase pressure, and determining a condition of the compressor based on an analysis of both the monitored reservoir pressure and crankcase pressure. In another embodiment, a method for diagnosing a compressor includes operating a multi-stage compressor to charge a reservoir with compressed air, monitoring at least a crankcase pressure and an intermediate stage pressure, and determining a condition of the compressor based on an analysis of both the monitored crankcase pressure and the monitored intermediate stage pressure. In yet another embodiment, a method for diagnosing a compressor includes monitoring signals from at least two of a primary reservoir pressure sensor, an intermediate reservoir pressure sensor, a crankcase pressure sensor, and a crankshaft position sensor, and correlating the monitored signals to identify a failure condition of the compressor. In yet another embodiment, a method of diagnosing a compressor includes actuating an unloader valve, monitoring at least a reservoir pressure sensor and a crankshaft position sensor, and identifying a leak condition of a valve disposed between a cylinder and a reservoir of a compressor. By way of example and not limitation, the subject disclosure can be utilized alone or in combination with a system and/or method disclosed in U.S. Provisional Application Ser. No. 61/636,192, filed Apr. 20, 2012, and entitled "SYSTEM AND METHOD FOR A COMPRESSOR" in which the entirety of the aforementioned application is incorporated herein by reference.

The methods and systems disclosed herein may be applied to a reciprocating compressor having one or more compressor stages, such as the compressor illustrated in FIG. 2. In other embodiments, the methods and systems may be applied to other types of compressors. For example, the compressor may be a diaphragm or membrane compressor in which the compression is produced by movement of a flexible membrane. The compressor may also be a hermetically sealed or semi-hermetically sealed compressor. In addition, the compressor types may include centrifugal compressors, diagonal or mixed flow compressors, axial flow compressors, rotary screw compressors, rotary vane compressors, and scroll compressors, among others.

The methods presently disclosed may also include generating a signal corresponding to the failure condition and alerting an operator or other personnel so that remedial action may be taken. Each of these systems and methods described above may also be implemented on a vehicle system such as the rail vehicle 106 described above. In still yet other embodiments, a test kit is provided that includes a controller having a memory and a processor configured to perform the methods described above.

In each of the embodiments presently disclosed, component fault data may be recorded. In one embodiment, component fault data may be stored in a database including historical compressor data. For example, the database may be stored in memory 134 of controller 130. As another example, the database may be stored at a site remote from rail vehicle 106. For example, historical compressor data may be encapsulated in a message and transmitted with communications system 144. In this manner, a command center may monitor the health of the compressor in real-time. For example, the command center may perform steps to diagnose the condition of the compressor using the compressor data transmitted with communications system 144. For example, the command center may receive compressor data including cylinder pressure data from rail vehicle 106, reservoir pressure, intermediate stage pressure, crankcase pressure, displacement of one or more pistons, and/or movement of the crankshaft to diagnose potential degradation of the compressor. Further, the command center may schedule maintenance and deploy healthy locomotives and maintenance crews in a manner to optimize capital investment. Historical compressor data may be further used to evaluate the health of the compressor before and after compressor service, compressor modifications, and compressor component change-outs.

If a leak or other fault condition exists, further diagnostics and response may be performed. For example, a potential faulty valve condition can be reported to notify appropriate personnel. In an embodiment, reporting is initiated with a signal output to indicate that a fault condition exists. The report is presented via display 140 or a message transmitted with communications system 144, as examples. Once notified, the operator may adjust operation of rail vehicle 106 to reduce the potential of further degradation of the compressor.

In one embodiment, a message indicating a potential fault is transmitted with communications system 144 to a command center. Further, the severity of the potential fault may be reported. For example, diagnosing a fault based on the above described methods may allow a fault to be detected earlier than when the fault is diagnosed with previously available means. In some applications, the compressor is permitted to continue operating when a potential fault is diagnosed in the early stages of degradation. In other applications, the compressor is stopped or maintenance may be promptly scheduled, such as when the potential fault is diagnosed as severe. In this manner the cost of secondary damage to the compressor can be avoided by early and accurate detection.

The severity of the potential fault may be determined based upon an analysis of one or more parameters from one or more diagnostic methods. For example, it may be more desirable to switch off the compressor than to have a degraded cylinder fail in a manner that may cause additional damage to the compressor. In one embodiment, a threshold value or one or more monitored parameters may be determined that indicates continued operation of the compressor is undesirable because the potential fault is severe. As one example, the potential fault may be judged as severe if the leakage of an exhaust valve exceeds a predetermined threshold.

In some embodiments, a request to schedule service is sent, such as by a message sent via communications system 144. Further, by sending the potential fault condition and the severity of the potential fault, down-time of rail vehicle 106 may be reduced. For example, service may be deferred on rail vehicle 106 when the potential fault is of low severity. Down-time may be further reduced by derating power of the compressor, such as by adjusting a compressor operating parameter based on the diagnosed condition.

In yet other embodiments, backup or redundant systems may be available. In an example, backup systems can be evaluated to determine if adequate substitute resources exist to replace the compromised compressor. In some instances, a pre-ordered list of backup systems is used to prioritize the use of backup systems, such as other compressors configured to supply compressed air to pneumatic devices on a plurality of rail vehicles. Various backup systems may be employed including stopping the faulty compressor and receiving charged air from another source. In one example, the other source is a compressor that is disposed on an adjacent locomotive engine. In another example, the other source is a redundant compressor on the same locomotive that is used for this purpose. The backup procedure can be designed to minimize negative system-wide consequences to operation of the locomotive. This is especially true for mission critical systems.

The aforementioned systems, components, (e.g., detection component, controller, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 6:
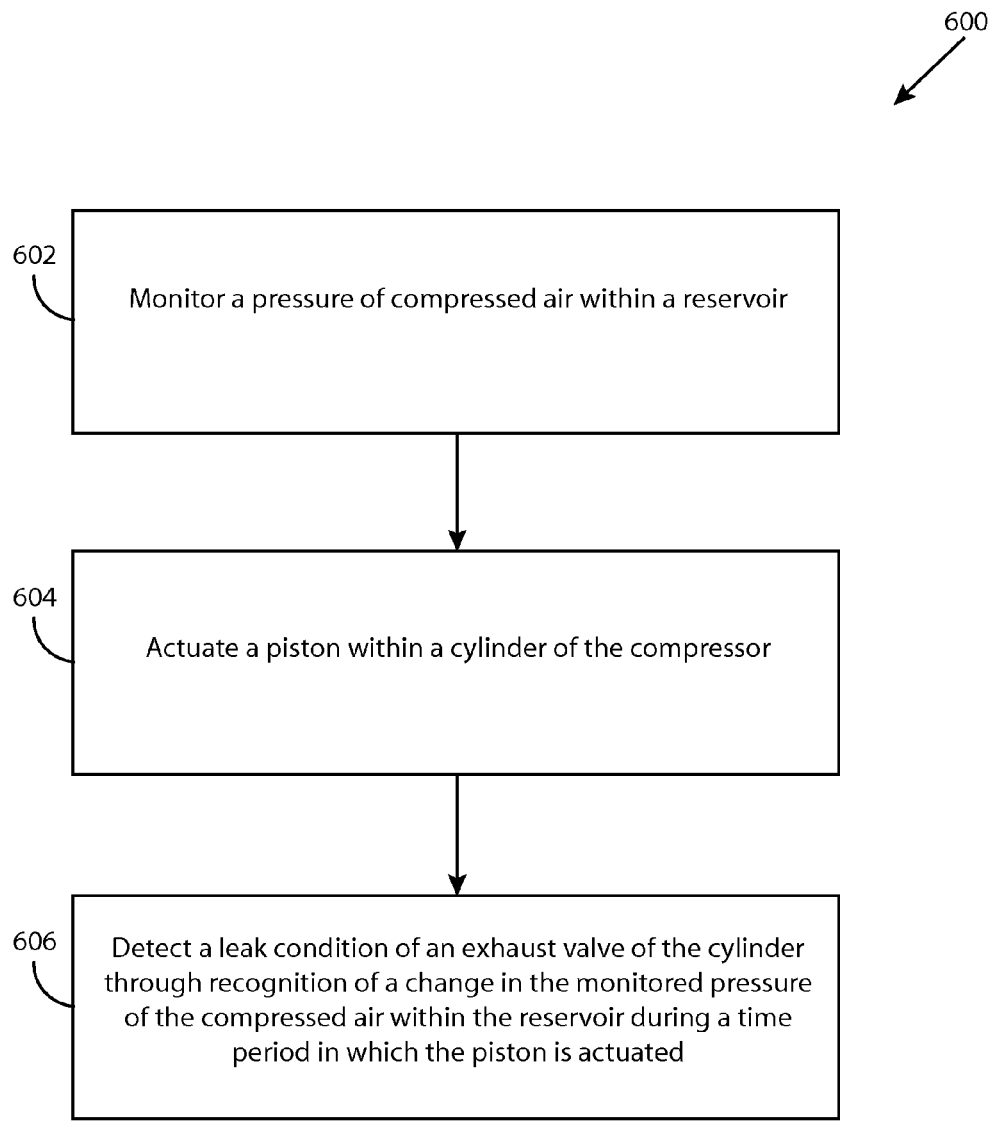
FIG. 6 is a flow chart of an embodiment of a method for identifying a leak condition for a compressor based upon a cycling piston.

In view of the exemplary devices and elements described supra, methodologies that may be implemented in accordance with the disclosed subject matter will be better appreciated with reference to the flow chart of FIG. 6. The methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter. The methodologies can be implemented by a component or a portion of a component that includes at least a processor, a memory, and an instruction stored on the memory for the processor to execute.

FIG. 6 illustrates a flow chart of a method 600 for identifying a leak condition for a compressor based upon a cycling piston. At reference numeral 602, a pressure of compressed air within a reservoir can be monitored. At reference numeral 604, a piston within a cylinder of the compressor can be actuated. At reference numeral 606, a leak condition of an exhaust valve of the cylinder can be detected through recognition of a change in the monitored pressure of the compressed air within the reservoir during a time period in which the piston is actuated.

In an embodiment, a method for a compressor is provided that includes monitoring a pressure of compressed air within a reservoir; actuating a piston within a cylinder of the compressor; and detecting a leak condition of an exhaust valve of the cylinder through recognition of a change in the monitored pressure of the compressed air within the reservoir during a time period in which the piston is actuated. In an embodiment, the method can further include detecting a leak condition of the exhaust valve of the cylinder by correlating the monitored pressure of the compressed air within the reservoir with an indication of a position of the piston in the cylinder. In an embodiment, the method includes filling the reservoir with compressed air to a determined pressure value, wherein the reservoir is configured to store compressed air to be provided to at least one pneumatic device.

In an embodiment of the method, actuating the piston within the cylinder can include cycling the piston within the cylinder at a first rate during a first portion of the time period and cycling the piston within the cylinder at a second rate during a second portion of the time period. In an embodiment, detecting a leak condition of the exhaust valve of the cylinder includes recognizing a once-per-revolution signature in a frequency analysis of the monitored pressure, wherein the once-per-revolution signature corresponds to a rate at which the piston is actuated within the cylinder.

In an embodiment, actuating the piston within the cylinder includes cycling the piston within the cylinder in an unloaded condition. In an embodiment, actuating the piston within the cylinder can include cycling the piston within the cylinder in a loaded condition. In an embodiment, detecting a leak condition of the exhaust value of the cylinder further includes recognizing a reduction in the monitored pressure corresponding to a suction stroke of the piston in the cylinder. In an embodiment, detecting a leak condition of the exhaust valve of the cylinder further includes recognizing an increase in the monitored pressure corresponding to a compression stroke of the piston in the cylinder.

In an embodiment, the method also includes generating a signal in response to recognizing a change in the monitored pressure of the compressed air within the reservoir during a time period in which the piston is actuated. In an embodiment, the method includes reducing a duty cycle of the compressor in response to recognizing a change in the monitored pressure of the compressed air within the reservoir during a time period in which the piston is actuated. In an embodiment, the method includes notifying personnel via one or more of an audio alarm, a visual alarm, a text message, an email, an instant message, or a phone call in response to recognizing a change in the monitored pressure of the compressed air within the reservoir during a time period in which the piston is actuated.

In an embodiment, a controller that is operable to determine a condition of a compressor is disclosed. The controller is configured to receive a signal corresponding to a monitored pressure of compressed air within a reservoir of a compressor; and detect a leak condition of an exhaust valve of a cylinder of the compressor through recognition of a change in the monitored pressure of the compressed air within the reservoir during a time period in which a piston is actuated within the cylinder. In an embodiment, the controller is further configured to actuate the piston within the cylinder of the compressor during at least a portion of the time period. The controller 130 can actuate a piston within the compressor such that the actuation is outside the compressor's normal duty cycle for compressing air. During this actuation outside the normal duty cycle, the system can detect a leak condition based upon comparisons of the monitored pressure. In another embodiment, the controller 130 can actuate the piston within the compressor such that the actuation is inside the compressor's normal duty cycle for compressing air. During this actuation inside the normal duty cycle, the system can detect a leak condition based upon comparison of the monitored pressure. Thus, the controller 130 can actuate the piston outside the compressor's normal duty cycle, inside the compressor's normal duty cycle, an alternating actuating of the piston from inside or outside the normal duty cycle, or a combination thereof. In an embodiment, the controller is further configured to correlate the signal corresponding to the monitored pressure of the compressed air within the reservoir with an indication of a position of the piston in the cylinder of the compressor. In an embodiment, the controller is further configured to actuate the piston within the cylinder of the compressor in an unloaded condition. In an embodiment, the controller is further configured to actuate the piston within the cylinder of the compressor in a loaded condition.

In an embodiment, the controller is further configured to recognize a reduction in the monitored pressure corresponding to a suction stroke of the piston in the cylinder. In an embodiment, the controller is further configured to recognize an increase in the monitored pressure corresponding to a compression stroke of the piston in the cylinder. In an embodiment, the controller is further configured to recognize a once-per-revolution signature in a frequency analysis of the monitored pressure, wherein the once-per-revolution signature corresponds to a rate at which the piston is actuated within the cylinder. In an embodiment, the controller is further configured to communicate with one or more reservoir pressure sensors and receive the signal corresponding to the monitored pressure from the one or more reservoir pressure sensors.

In embodiments, a system is disclosed that includes an engine; a compressor operatively connected to the engine, wherein the compressor includes a reservoir configured to store compressed air; a controller that is operable to determine a condition of the compressor, wherein the controller is configured to receive a signal corresponding to a monitored pressure of compressed air within the reservoir, and detect a leak condition of an exhaust valve of a cylinder of the compressor through recognition of a change in the monitored pressure of the compressed air within the reservoir during a time period in which a piston is actuated within the cylinder.

In embodiments, a compressor system is disclosed that includes means for means for monitoring a pressure of compressed air within a reservoir (for instance, a pressure sensor 185 can monitor a pressure of compressed air within a reservoir); means for actuating a piston within a cylinder (for example, a controller 130 can actuate a piston within a cylinder); and means for detecting a leak condition of an exhaust valve of the cylinder through recognition of a change in the monitored pressure of the compressed air within the reservoir during a time period in which the piston is actuated (for example, a detection component 128 can detect a leak condition of an exhaust valve of the cylinder).

In an embodiment, a compressor can be provided that includes a reservoir configured to receive and store compressed air for use with at least one pneumatic device and a sensor configured to monitor a pressure of compressed air within the reservoir. The compressor can additionally include a compressor stage that has an exhaust port and an exhaust valve configured to seal the exhaust port, wherein the compressor stage is configured to compress air and discharge the compressed air through the exhaust port into the reservoir. In the embodiment, the compressor can further include means for detecting a leak condition of the compressor through recognition of a change in the monitored pressure of the compressed air within the reservoir during a time period in which the compressor stage is operated in an unloaded condition.

In the embodiment, the compressor stage can include a cylinder and a piston, wherein the piston is actuated in the cylinder to compress air to be discharged into the reservoir through the exhaust port. In the embodiment, the compressor can include means for unloading the compressor stage by venting the compressor stage to atmospheric pressure.

As used herein, the terms "high pressure" and "low pressure" are relative to one another, that is, a high pressure is higher than a low pressure, and a low pressure is lower than a high pressure. In an air compressor, low pressure may refer to a pressure that is higher than atmospheric pressure, but that is lower than another, higher pressure in the compressor. For example, air at atmospheric pressure may be compressed to a first, low pressure (which is still higher than atmospheric pressure), and further compressed, from the first, low pressure, to a second, high pressure that is higher than the low pressure. An example of a high pressure in a rail vehicle context is 140 psi (965 kPa).

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method comprising:
    monitoring a pressure of compressed air within a reservoir of a compressor, the reservoir configured to store compressed air to be provided to at least one pneumatic device, and the compressor having a first stage to compress air to a first pressure level and having a second stage to pressurize air from the first stage to a second pressure level which is greater than the first pressure level;
    actuating a piston within a cylinder of the second stage of the compressor; and
    detecting a leak condition of an exhaust valve of the cylinder based on an analysis of a frequency domain of the monitored pressure of the compressed air within the reservoir during a time period in which the piston is actuated;
    wherein detecting a leak condition of the exhaust valve of the cylinder further comprises correlating the monitored pressure of the compressed air within the reservoir with an indication of a position of the piston in the cylinder.

2. The method of claim 1, further comprising filling the reservoir with compressed air to a determined pressure value.

3. The method of claim 1, wherein actuating the piston within the cylinder comprises cycling the piston within the cylinder in an unloaded condition.

4. The method of claim 1, wherein actuating the piston within the cylinder comprises cycling the piston within the cylinder in a loaded condition.

5. The method of claim 1, wherein detecting a leak condition of the exhaust value of the cylinder further comprises recognizing a reduction in the monitored pressure corresponding to a suction stroke of the piston in the cylinder.

6. The method of claim 1, wherein detecting a leak condition of the exhaust valve of the cylinder further comprises recognizing an increase in the monitored pressure corresponding to a compression stroke of the piston in the cylinder.

7. The method of claim 1, further comprising generating a signal in response to recognizing the change in the monitored pressure of the compressed air within the reservoir during the time period in which the piston is actuated.

8. The method of claim 7, wherein the signal is generated for notifying personnel, and the signal comprises one or more of an audio alarm, a visual alarm, a text message, an email, an instant message, or a phone call.

9. The method of claim 1, further comprising reducing a duty cycle of the compressor in response to recognizing the change in the monitored pressure of the compressed air within the reservoir during the time period in which the piston is actuated.

10. The method of claim 1, wherein the compressor is disposed in a vehicle system.

11. A controller that is operable in association with a compressor, wherein the controller is configured to:
receive a signal corresponding to a monitored pressure of compressed air within a reservoir configured to store compressed air to be provided to at least one pneumatic device, the compressed air, from a compressor having a first stage to compress air to a first pressure level and having a second stage to pressurize air from the first stage to a second pressure level which is greater than the first pressure level;
detect a leak condition of an exhaust valve of a cylinder of the second stage of the compressor based on an analysis of a frequency domain of the monitored pressure of the compressed air within the reservoir during a time period in which a piston is actuated within the cylinder; and
responsive to the leak condition that is detected, at least one of control a duty cycle of the compressor, disconnect power to the compressor such that the compressor ceases operating, adjust operation of another compressor, or generate a signal for notifying personnel;
wherein the controller is further configured to correlate the signal corresponding to the monitored pressure of the compressed air within the reservoir with an indication of a position of the piston in the cylinder of the compressor.

12. The controller of claim 11, wherein the controller is further configured to actuate the piston within the cylinder of the compressor during at least a portion of the time period.

13. The controller of claim 11, wherein the controller is further configured to actuate the piston within the cylinder of the compressor in an unloaded condition.

14. The controller of claim 11, wherein the controller is further configured to actuate the piston within the cylinder of the compressor in a loaded condition.

15. The controller of claim 11, wherein the controller is further configured to detect the leak condition based on recognizing an increase in the monitored pressure corresponding to a compression stroke of the piston in the cylinder.

16. The controller of claim 11, wherein the controller is further configured to communicate with one or more reservoir pressure sensors and receive the signal corresponding to the monitored pressure from the one or more reservoir pressure sensors.

17. A vehicle system comprising the controller of claim 11.

18. A method comprising:
with a pressure sensor, monitoring a pressure of compressed air within a reservoir of a compressor, the reservoir configured to store compressed air to be provided to at least one pneumatic device, and the compressor having a first stage to compress air to a first pressure level and having a second stage to pressurize air from the first stage to a second pressure level which is greater than the first pressure level;
with a controller, actuating a piston within a cylinder of the second stage of the compressor; and
with the controller, detecting a leak condition of an exhaust valve of the cylinder based on an analysis of a frequency domain of the monitored pressure of the compressed air within the reservoir during a time period in which the piston is actuated;
wherein detecting a leak condition of the exhaust valve of the cylinder further comprises correlating the monitored pressure of the compressed air within the reservoir with an indication of a position of the piston in the cylinder.

19. The method of claim 18, wherein the compressor is disposed in a vehicle system.

20. A system comprising:
a compressor having a first stage, a second stage, and a reservoir, wherein the first stage is configured to compress air to a first pressure level, and the second stage is configured to store compressed air within the reservoir by pressurizing air from the first stage to a second pressure level which is greater than the first pressure level, the reservoir configured to store the compressed air to be provided to at least one pneumatic device;
a pressure sensor; and
a controller, wherein the controller is configured to:
receive a signal from the pressure sensor corresponding to a monitored pressure of the compressed air within the reservoir;
detect a leak condition of an exhaust valve of a cylinder of the second stage of the compressor based on an analysis of a frequency domain of the monitored pressure of the compressed air within the reservoir during a time period in which a piston is actuated within the cylinder; and
responsive to the leak condition that is detected, at least one of control a duty cycle of the compressor, disconnect power to the compressor such that the compressor ceases operating, adjust operation of another compressor, or generate a signal for notifying personnel;
wherein the controller is further configured to correlate the signal corresponding to the monitored pressure of the compressed air within the reservoir with an indication of a position of the piston in the cylinder of the compressor.

21. A vehicle comprising the system of claim 20.

* * * * *